United States Patent
Spencer et al.

(10) Patent No.: US 11,516,354 B2
(45) Date of Patent: Nov. 29, 2022

(54) IMAGING DEVICE WITH AUDIO PORTION

(71) Applicant: Hewlett-Packard Development Company, L.P., Spring, TX (US)

(72) Inventors: Stuart D. Spencer, Vancouver, WA (US); Dan Arquilevich, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 431 days.

(21) Appl. No.: 16/615,183

(22) PCT Filed: Jun. 30, 2017

(86) PCT No.: PCT/US2017/040491
§ 371 (c)(1),
(2) Date: Nov. 20, 2019

(87) PCT Pub. No.: WO2019/005155
PCT Pub. Date: Jan. 3, 2019

(65) Prior Publication Data
US 2020/0162623 A1    May 21, 2020

(51) Int. Cl.
*H04N 1/00* (2006.01)
*G10K 11/16* (2006.01)
*H04M 1/03* (2006.01)

(52) U.S. Cl.
CPC ......... *H04N 1/00281* (2013.01); *G10K 11/16* (2013.01); *H04M 1/035* (2013.01); *H04N 2201/0094* (2013.01)

(58) Field of Classification Search
CPC ...... H04N 1/00281; H04N 2201/0094; H04M 1/035; G10K 11/16; H04W 4/80
USPC .......................................................... 358/1.1
See application file for complete search history.

(56) References Cited

U.S. PATENT DOCUMENTS

| | | | |
|---|---|---|---|
| 7,995,769 B2 * | 8/2011 | Nakane ............ | G10K 11/17881 381/71.1 |
| 8,798,308 B2 | 8/2014 | Litovsky et al. | |
| 2012/0008095 A1 | 1/2012 | Sakashita et al. | |
| 2012/0147401 A1 | 6/2012 | Poh et al. | |
| 2013/0098987 A1 * | 4/2013 | Jimenez Lamo .... | G07G 1/0081 235/375 |
| 2016/0088379 A1 | 3/2016 | Lobisser et al. | |
| 2017/0053633 A1 | 2/2017 | Ishida et al. | |
| 2018/0101711 A1 * | 4/2018 | D'Souza .............. | G06K 9/0002 |

FOREIGN PATENT DOCUMENTS

| | | |
|---|---|---|
| CN | 201197184 Y | 2/2009 |
| CN | 202507679 U | 10/2012 |
| RU | 8834 U1 | 12/1998 |

* cited by examiner

*Primary Examiner* — Darryl V Dottin
(74) *Attorney, Agent, or Firm* — Michael Dryja

(57) ABSTRACT

An example device includes an imaging portion, an audio portion and at least one acoustic isolation feature. The audio portion is integrally coupled to the imaging portion. The audio portion is to provide an audio output. The at least one acoustic isolation feature is to facilitate acoustic separation of the imaging portion and the audio portion.

18 Claims, 5 Drawing Sheets

IMAGING DEVICE WITH AUDIO PORTION

BACKGROUND

Imaging systems may include various devices, such as printers, copiers, scanners or the like. Some systems include multiple imaging functions and may include two or more of printing or copying functionalities. Such devices may be found in various environments, including large or small offices.

BRIEF DESCRIPTION OF THE DRAWINGS

For a more complete understanding of various examples, reference is now made to the following description taken in connection with the accompanying drawings in which.

DETAILED DESCRIPTION

Various examples provide for devices, such as multifunctional devices, which include an audio portion, such as a speaker system. The example devices may be multifunctional devices with an imaging portion, such as a printer, scanner or copier. The example devices are further provided with an audio portion which may include a wireless interface. The wireless interface allows the audio portion to connect to a communication device, such as a mobile device through, for example, a Bluetooth connection or other wireless connection. The audio portion may be coupled to the imaging portion and may operate in accordance with a controller of the imaging portion. Acoustic insulation features are provided to reduce undesirable-effects related to the audio portion.

As described above, imaging systems may include various devices, such as printers, copiers, scanners or the like. Imaging systems are commonplace in most office environments. Whether in large offices or small offices, such devices may compete with various other devices for the limited physical space. For example, a small office may have limited space for a printer, scanner and the various other components that may exist in the office environment. Accordingly, the present disclosure describes example systems which combine imaging functionality with a wireless audio portion which may include, for example, at least one speaker.

Figure 1:
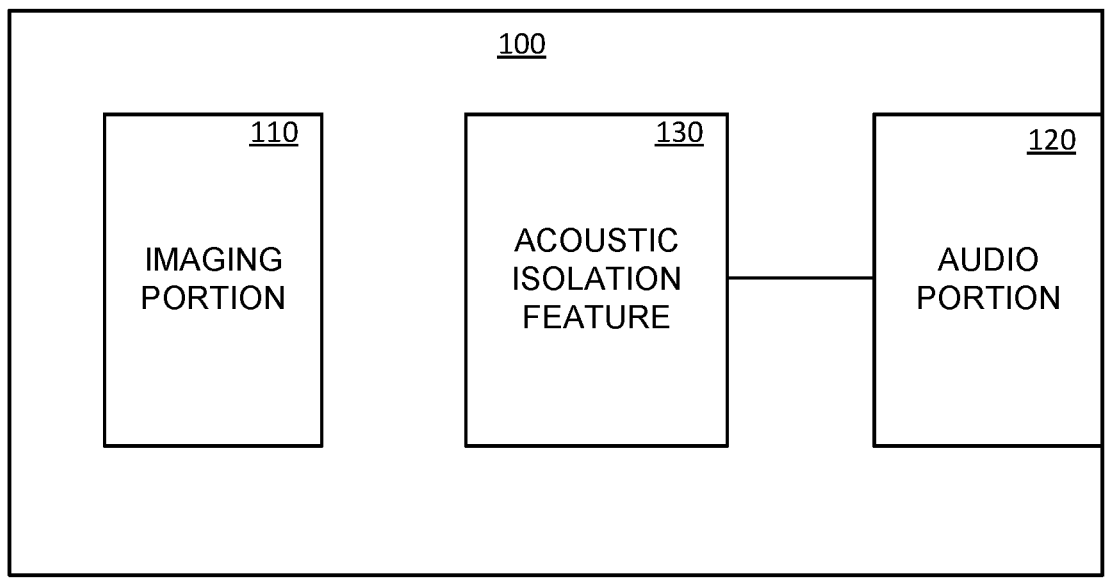
FIG. 1 is a schematic illustration of an example device with an imaging portion.

Referring now to the figures, FIG. 1 illustrates an example device 100 with an imaging portion. The example device 100 of FIG. 1 includes an imaging portion 110, an audio portion 120 and an acoustic isolation feature 130. In one example, the imaging portion 110, the audio portion 120 and the acoustic isolation feature 130 are integrally formed in the example device 100. In this regard, each of the imaging portion 110, the audio portion 120 and the acoustic isolation feature 130 may be provided within a single housing, for example.

The imaging portion 110 of the example device 100 may include functionality of various imaging functions. For example, the imaging portion 110 may include various components or subsystems to provide printing, scanning, copying or faxing. In this regard, the imaging portion 110 of the example device 100 may include a print media input section, an image forming section and an output section to provide printing functionality, for example. The image forming section may include printheads to form an image on print media. Similarly, various components may provide scanning functionality and/or copying functionality.

In various examples, the imaging portion 110 of the example device 100 forms a multifunction device which includes at least two functionalities. For example, the imaging portion 110 may include components which provide all of the functionalities described above, including printing, copying, scanning and faxing.

In various examples of the device 100, the audio portion 120 provides an audio input. In this regard, the audio portion 120 may include at least one speaker. In some examples, the audio portion 120 may include additional components, such as a passive radiator, power module or a wireless communication module, as described below in greater detail. In one example, the audio portion includes a wireless interface, such as a Bluetooth interface, to couple the audio portion 120 directly to a user device, such as a mobile device. In this regard, the audio portion 120 may communicate with the user device without disruption of any wireless communication required by the imaging portion. In other examples, the imaging portion 110 and the audio portion 120 may share a network interface for communication with various user device.

The acoustic isolation feature 130 of the example device 100 is provided to facilitate acoustic separation of the imaging portion 110 and the audio portion 120. For example, the acoustic isolation feature 130 may be provided to dissipate vibration or standing waves resulting from operation of the audio portion 120 or the imaging portion 110. In various examples, the acoustic isolation feature 130 may include ribs or a textured surface provided on an enclosure of the audio portion 120 to absorb, dampen or dissipate standing waves or vibration.

Figure 2:
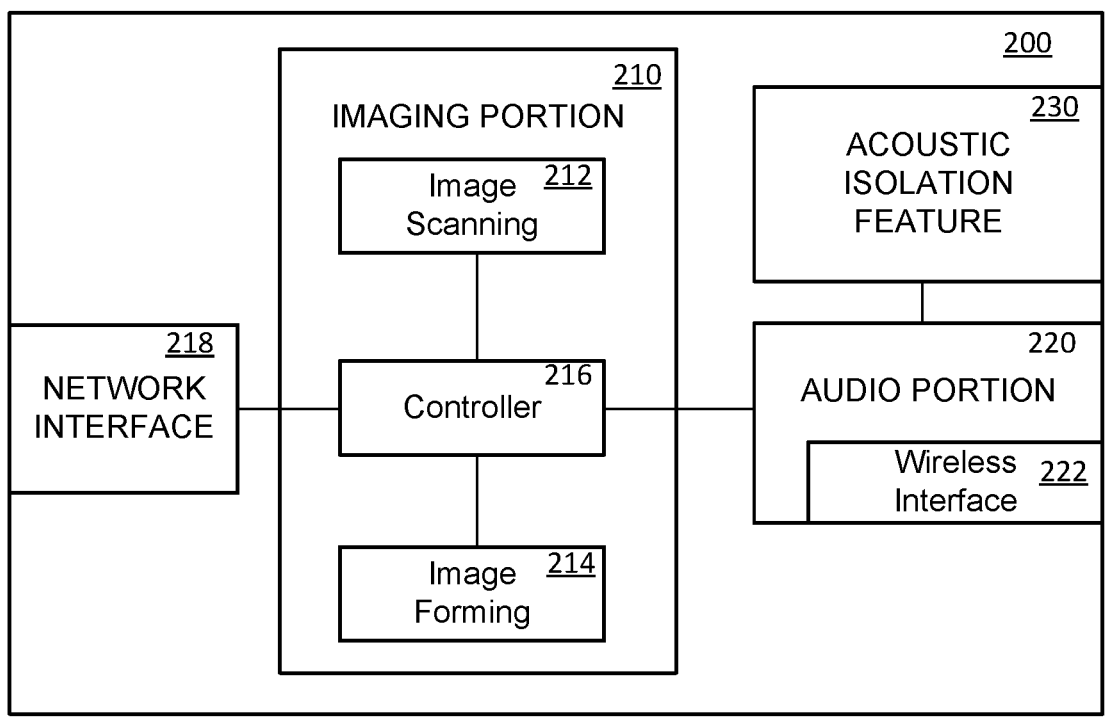
FIG. 2 is a schematic illustration of another example device with an imaging portion.

Referring now to FIG. 2, a schematic illustration of another example device 200 with an imaging portion is illustrated. The example device 200 of FIG. 2 is similar to the example device 100 described above with reference to FIG. 1. In this regard, the example device 200 includes an imaging portion 210, an audio portion 220 and an acoustic isolation feature 230. The audio portion 220 and the acoustic isolation feature 230 of the example device 200 are similar to the audio portion 120 and the acoustic isolation feature 130, respectively, of the example device 100 described above with reference to FIG. 1.

The imaging portion 210 of the example device 200 of FIG. 2 includes an image scanning portion 212 and an image forming portion 214. The image scanning portion 212 may include hardware, software and/or firmware to provide for scanning of an image input to the image portion 210 of the example device 200. For example, a print media such as paper with an image may be input to the image portion 210, and the image scanning portion 212 may scan the image. The image scanning portion 212 may, thus, be useful for copying, scanning or faxing functionalities.

Similarly, the image forming portion 214 of the imaging portion 210 may be provided to form an image on, for example, print media such as paper. In this regard, the image forming portion 214 may include hardware, software and/or firmware to, for example, print an image onto print media. Thus, the image forming portion 214 may be useful for printing, scanning or faxing functionalities.

The imaging portion 210 of the example device 200 further includes a controller 216. The controller 216 may be a central processor to control various functions of the imaging portion 210, as well as other portions of the example device 200. Further, the example device 200 includes a network interface 218 to allow the device 200 to be coupled to a network. In various examples, the network interface 218 may provide for a wired or wireless connection to allow coupling to the network. For example, the example device 200 may have a network interface 218 which includes an Ethernet port to allow a wired connection. In other examples, the network interface 218 may include a wireless interface to allow connection to the network through, for example, 3G or long-term evolution (LTE) connectivity. The network interface 218 may allow connectivity to various types of networks. For example, the network interface 218 may allow coupling of the example device 100 to a wide-area network, such as the Internet. In other examples, the network interface may allow coupling through a WiFi network in accordance with an IEEE 802.11 standard.

In various examples, the network interface 218 allows various user devices to couple to the audio portion 220. In this regard, the controller 216 of the imaging portion 210 may control communication with and operation of the audio portion 220. For example, a user device, such as a mobile phone, may couple to the example device 200 and access the audio portion 220. The mobile phone may use the audio portion 220 to, for example, play music from the mobile phone through a speaker in the audio portion 220.

In some examples, the audio portion 220 is provided with a dedicated wireless interface 222, such as a Bluetooth® module, for example. In this regard, a user device, such as a mobile phone, may couple to and access the audio portion 220 without the use of any communication interface of imaging portion 210. For example, the mobile phone may access the audio portion 220 directly through a Bluetooth connection and play music without the involvement of the controller 216 of the imaging portion 210.

Similar to the acoustic isolation feature 130 of the example device 100 of FIG. 1, the acoustic isolation feature 230 of FIG. 2 is provided to facilitate acoustic separation of the imaging portion 210 and the audio portion 220. Again, the acoustic isolation feature 230 may be provided to dissipate vibration or standing waves resulting from operation of the audio portion 220 or the imaging portion 210 and may include ribs or a textured surface to absorb, dampen or dissipate standing waves or vibration.

Various examples of the example device 200 may include various other components not shown in FIG. 2, such as a power portion and a storage portion. In some examples, the power portion may be shared by various components of the example device 200, including the audio portion 220.

Figure 3:
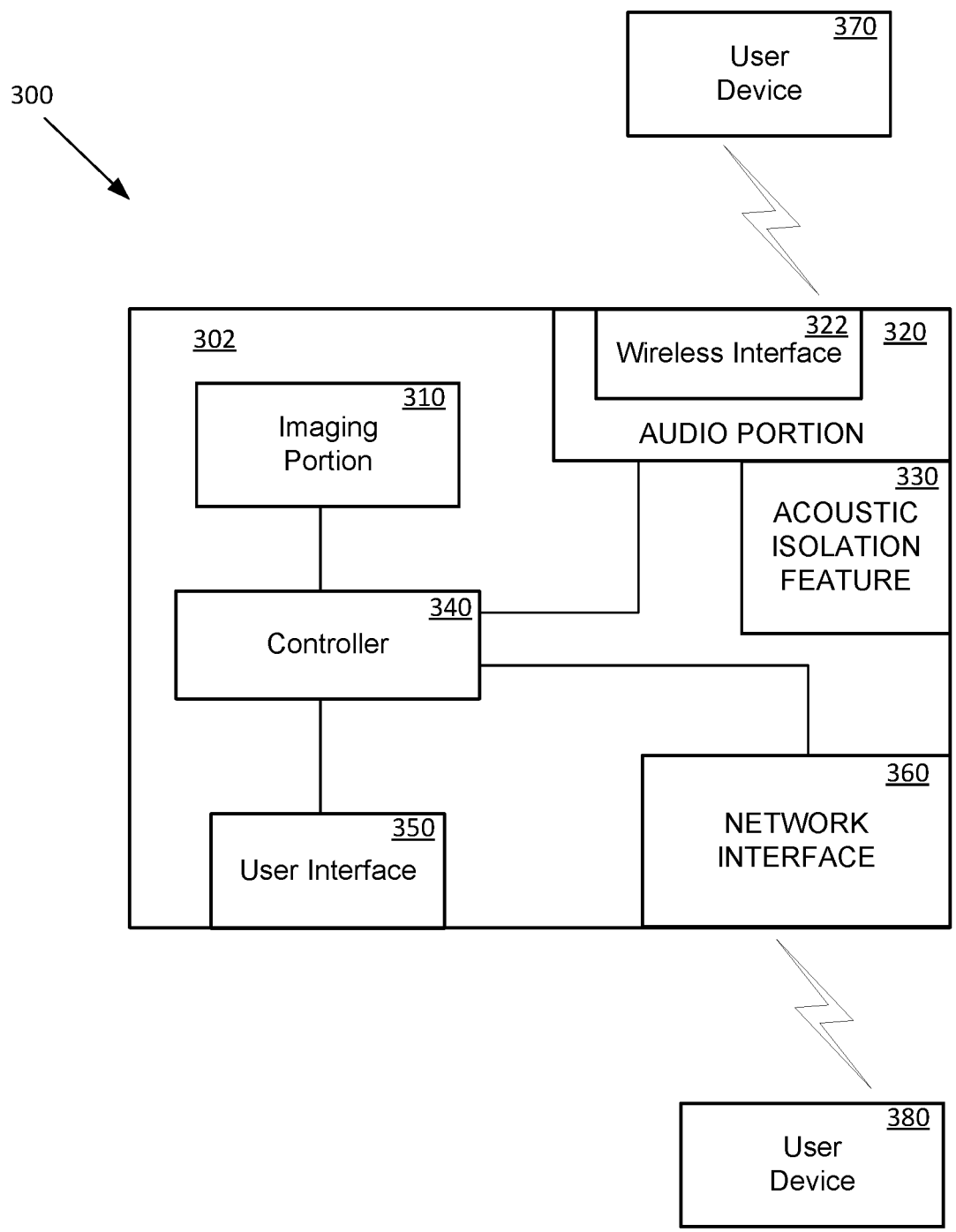
FIG. 3 is a schematic illustration of an example system with a multifunction device.

Referring now to FIG. 3, an example system with a multifunction device is schematically illustrated. The example system 300 includes an example multifunction device 302 that may be similar to the example devices 100, 200 described above with reference to FIGS. 1 and 2. In this regard, the example multifunction device 302 includes an imaging portion 310, an audio portion 320 and an acoustic insulation feature 330.

Similar to the imaging portion 110 of the example device 100 of FIG. 1, the imaging portion 310 of the example multifunction device 302 of FIG. 3 may include functionality of various imaging functions, such as printing, scanning, copying or faxing. In the example multifunction device 302, the imaging portion 310 may include at least two functionalities. For example, the imaging portion 310 may include functionalities including printing, copying, scanning and faxing.

In various examples, the audio portion 320 and the acoustic isolation feature 330 of the example device 302 are similar to the audio portion 120, 220 and the acoustic isolation feature 130, 230, respectively, of the example devices 100, 200 described above with reference to FIGS. 1 and 2. Further, the acoustic isolation feature 330 of FIG. 3 is provided to facilitate acoustic separation of the imaging portion 310 and the audio portion 320 and may include ribs or a textured surface to absorb, dampen or dissipate standing waves or vibration.

In the example multifunction device 302 of FIG. 3, the audio portion 320 is provided with a dedicated wireless interface 322, such as a Bluetooth® module, for example. A user device 370, such as a mobile phone, can couple to and access the audio portion 320 through the dedicated wireless interface 322. Thus, the coupling of the user device 370 and the audio portion 320 may be direct, without going through any other component of the multifunction device 302.

The example multifunction device 302 is further provided with a controller 340, a user interface 350 and a network interface 360. The controller 340 may be provided to facilitate interfacing of various components of the example multifunction device 302. In this regard, the audio portion 320 of the example multifunction device 302 may be coupled to the network interface 360 through the controller 340. Further, the user interface 350 may allow the example multifunction device 302 (or the controller 340) to receive inputs from a user. For example, the example multifunction device 302 may include a touch screen which serves as the user interface 350.

The network interface 360 of the example multifunction device 302 allows the multifunction device 302 to be coupled to a network. In various examples, the network interface 360 may provide for a wired (e.g., Ethernet) or wireless (e.g., LTE) connection to allow coupling to a wide-area network. Similarly, the network interface 360 may provide for a connection to allow coupling to a local-area network, such as a WiFi network in accordance with an IEEE 802.11 standard.

In the example illustrated in FIG. 3, the network interface 360 may allow the controller 340 to be coupled to a user device 380. Thus, the network interface 360 allows various user devices to couple to the audio portion 220 through the controller 340 of the example multifunction device 302. In this regard, the controller 340 may control communication with and operation of the audio portion 220. For example, the user device 380, such as a mobile phone, may couple to the example multifunction device 302 and access the audio portion 320.

Figure 4:
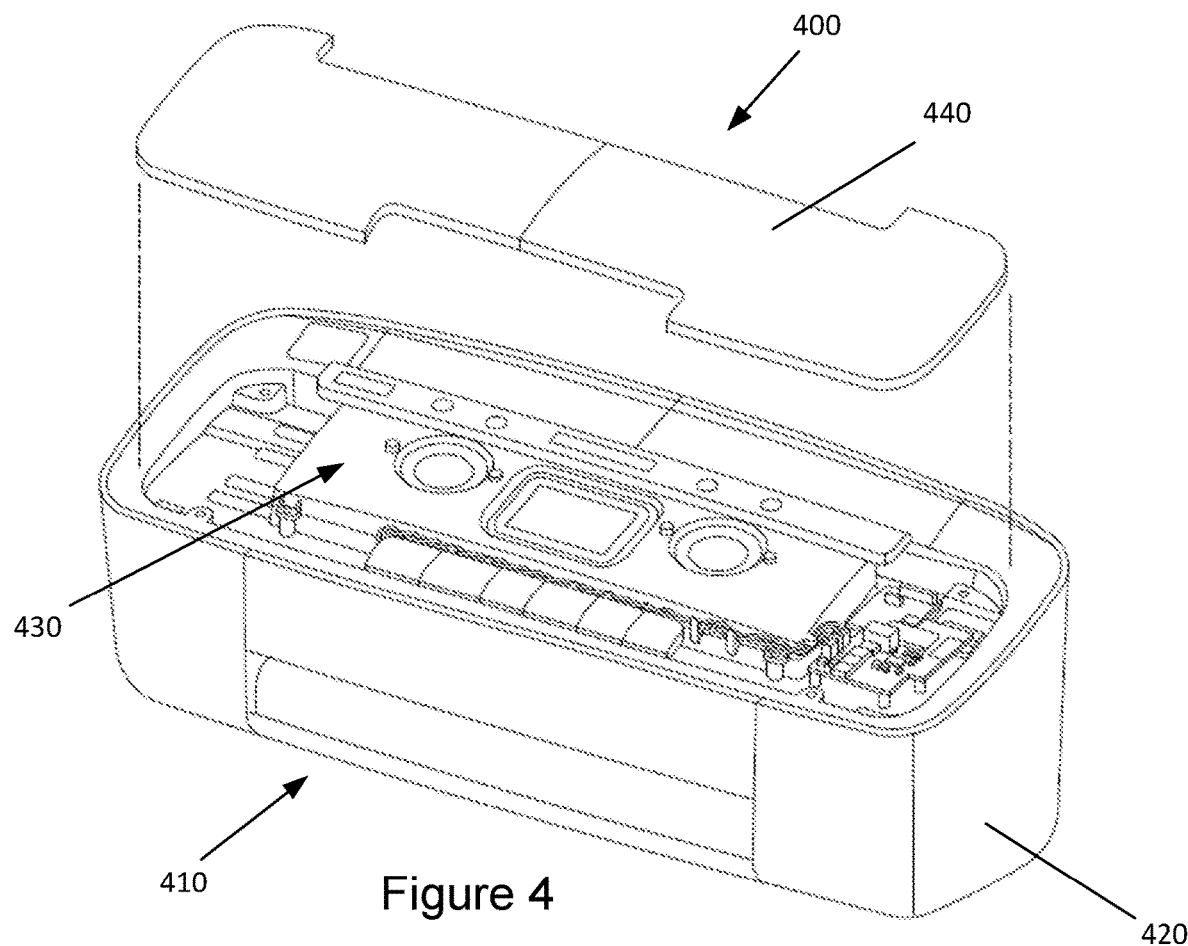
FIG. 4 illustrates an example device with an imaging portion.

FIG. 4 illustrates an example imaging device with an imaging portion. The example imaging device 400 of FIG. 4 is a personal or small printer that may be used in a home office or a small business office, for example. The example imaging device 400 includes an imaging portion 410. In the example of FIG. 4, the imaging portion 410 includes a printing function to form images on print media, such as paper. In other examples, the device 400 may be a multi-function device that includes, in addition to a printing function, scanning, copying and/or faxing functions. The imaging portion 410 is formed within a housing 420 that may be formed of any of a variety of materials, such as metal or plastic, for example.

The example imaging device 400 further includes an audio portion 430 to provide an audio output. An example of the audio portion 430 is described in greater detail below with reference to FIGS. 5-7. The audio portion 430 may be at least partially concealed from view by a cover 440 shown in FIG. 4 as removed from the housing 420. The cover 440 may include perforations or holes to allow sound from the audio portion 430 to pass through.

Figure 5:
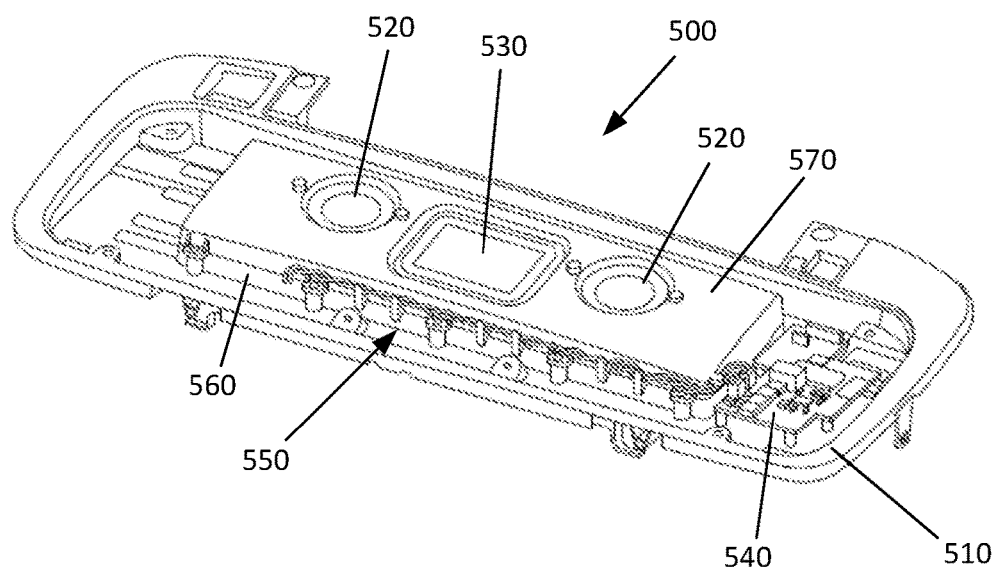
FIG. 5 illustrates an example audio portion of the example device of FIG. 4.

Referring now to FIG. 5, an example audio portion 500 for use with an example imaging device, such as the imaging device 400 of FIG. 4, is illustrated. In the example of FIG. 5, the audio portion 500 is positioned on a frame 510 that may be part or, or couple with, the housing of the imaging device, such as the housing 420 of the example imaging device 400 of FIG. 4. The frame 510 may be formed of any of a variety of materials, such as molded plastic, for example.

The example audio portion 500 includes a variety of audio components for output of audio. In the example of FIG. 5, the audio portion 500 includes speakers 520 and a passive radiator 530. The example audio portion 500 of FIG. 5 includes two speakers. Of course, other examples may include a different number of speakers and/or various other component not shown in the example of FIG. 5. The various components may be coupled to an electronics module 540 that is mounted on the frame 510. The electronics module 540 may include, for example, a wireless interface (e.g., Bluetooth module) and a power module. In various examples, the power module may be coupled to a primary power module of the imaging device. Thus, the audio portion 500 may be powered through the same source as an imaging portion of the imaging device, for example. The electronics module 540 may be coupled to a controller of the imaging device.

In the example of FIG. 5, various components of the audio portion 500 may be positioned within an enclosure 550. For example, the speakers 520 and the passive radiator are at least partly within the enclosure 550. The enclosure 550 in the example audio portion 500 of FIG. 5 includes a lower portion 560 and an upper portion 570. In the example of FIG. 5, the lower portion 560 is integrally formed with the frame 510, and the upper portion 570 is secured to the lower portion 560 with, for example, fasteners such as screws.

Figure 6:
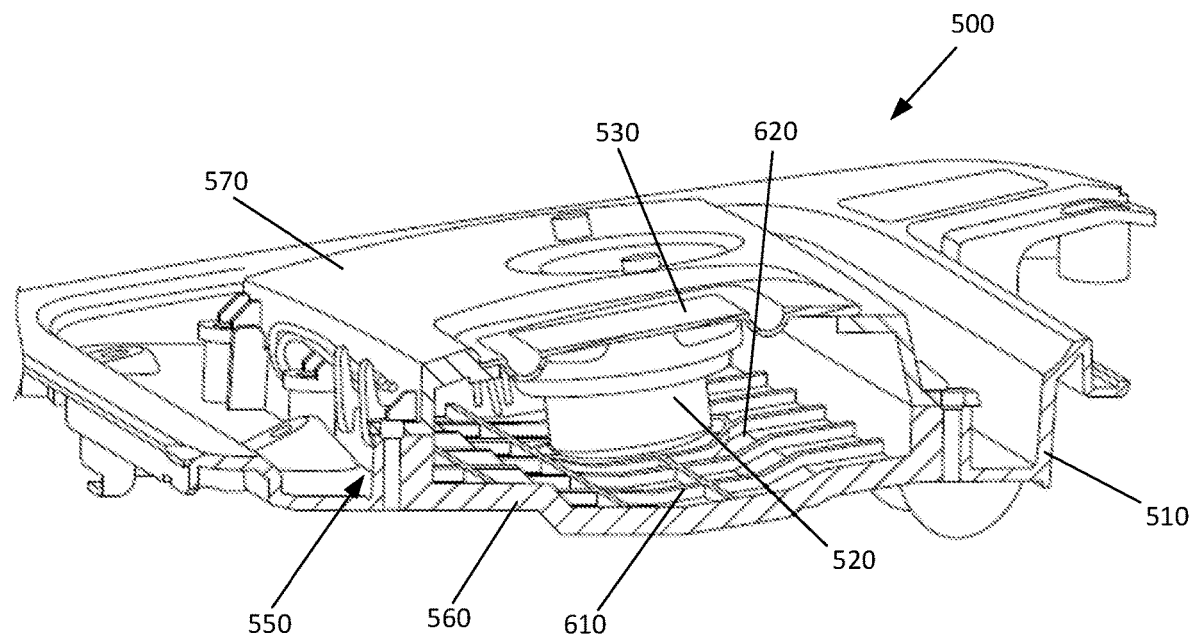
FIGS. 6 and 7 illustrate cut-away views of the example audio portion of FIG. 5.
Figure 7:
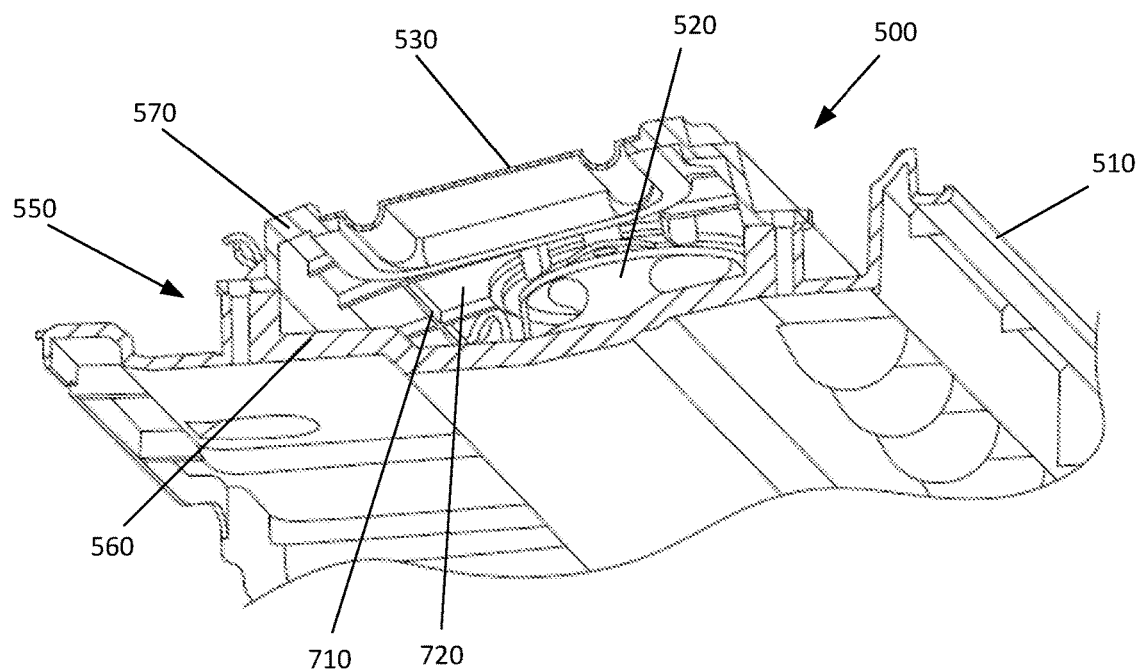

FIGS. 6 and 7 illustrate cut-away views of the example audio portion 500 of FIG. 5. Referring first to FIG. 6, the cut-away view shows the example audio portion 500 of FIG. 5 with a portion removed to show the inside of the enclosure 550. As illustrated in FIG. 6 and as described above, various components of the audio portion 500, such as the speaker 530 are positioned at least partly within the enclosure 550 formed of the lower portion 560 and the upper portion 570. As more clearly illustrated in FIG. 6, the lower portion 560 is integrally formed with the frame 510. For example, the lower portion 560 and the frame 510 may be formed of a molded plastic formed as a single component. The surface of the lower portion 560 that is on the inside of the enclosure 550 is provided with at least one acoustic isolating feature. In this regard, the lower portion 560 of the example audio portion 500 is provided with ribs 610 and textured surfaces 620. The ribs 610 and the textured areas 620 may serve to prevent standing waves from forming, as may occur with a smooth, flat surface. In various example, the textured areas 620 may be formed with a roughened material. In some examples, the material for the textured areas may include a coating (e.g., rubber) to absorb sound waves, for example. Further, the ribs 610 may provide rigidity to the lower portion 560, thereby preventing vibrations of the enclosure 550.

Referring now to FIG. 7, the cut-away view of the audio portion 500 shows the inside of the upper portion 570 of the enclosure 550. The surface of the upper portion 570 that is on the inside of the enclosure 550 may also be provided with various acoustic isolating features. For example, the upper portion 570 of the example audio portion 500 is provided with ribs 710 and textured surfaces 720 that are similar to the ribs 610 and the textured surfaces 620 of the lower portion 560 described above with reference to FIG. 6.

Figure 8:
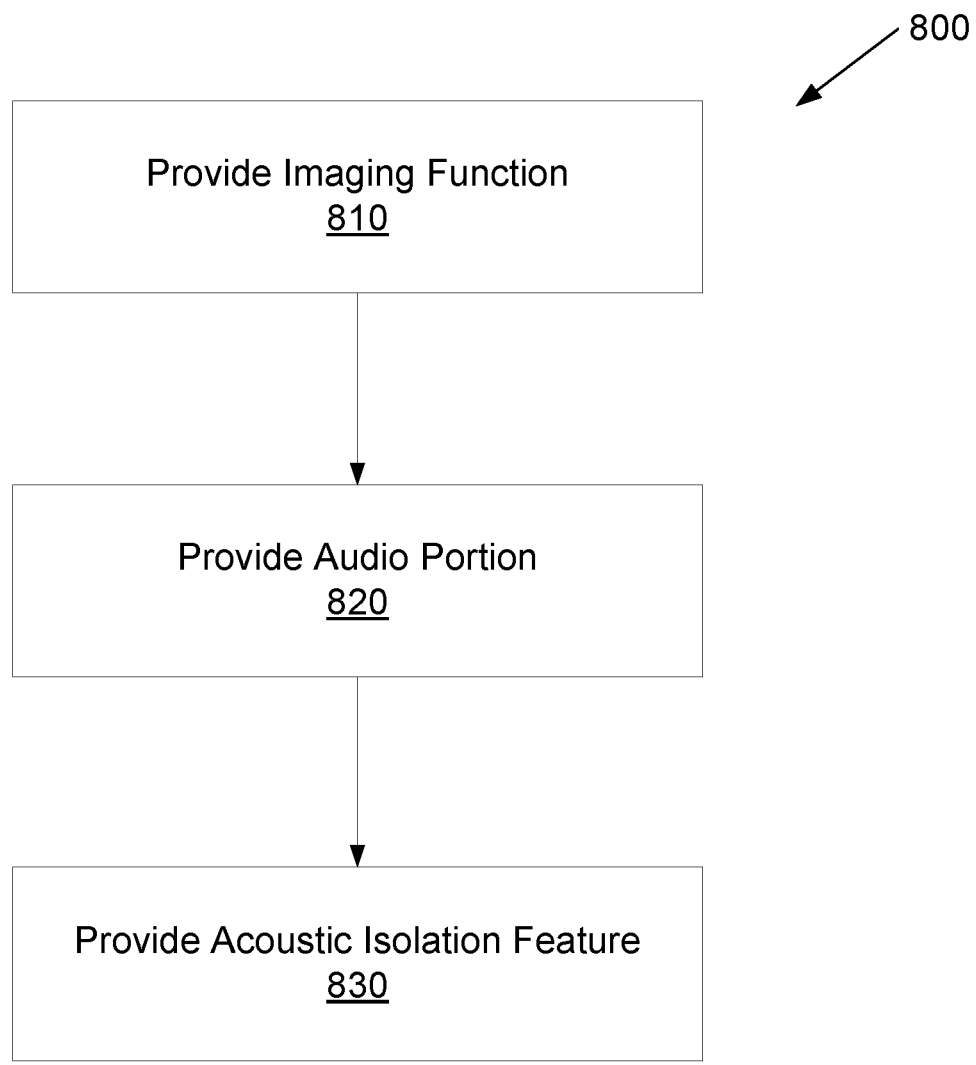
FIG. 8 is a flow chart illustrating an example process.

Referring now to FIG. 8, a flow chart illustrates an example process for forming an example device, such as a multifunctional device. The example process 800 includes providing an imaging function (block 410). The imaging function may include various components provided within a housing. As noted above, various imaging functions may include various components or subsystems to provide printing, scanning, copying or faxing. In this regard, the imaging portion of the example device may include a print media input section, an image forming section and an output section to provide printing functionality, for example. The image forming section may include printheads to form an image on print media. Similarly, various components may provide scanning functionality and/or copying functionality.

The process 400 further includes providing an audio portion within the same housing as the imaging function (block 420). In various examples, the audio portion includes at least one speaker. The audio portion may include additional components, such as a passive radiator, power module and electronics for operation of the audio portion.

The process 400 further includes providing at least one acoustic isolation feature to provide acoustic separation between the imaging function and the audio portion. In various examples, the acoustic isolation feature may include ribs and/or textured surfaces to provide acoustic separation between the imaging function and the audio portion.

Thus, in accordance with various examples described herein, example devices provide an audio portion (e.g., speaker) with an imaging portion. Providing the audio portion within the same housing as a multifunctional imaging device may reduce the combined footprint of various devices that may be desirable in an office environment.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device comprising:
a housing;
imaging hardware disposed within the housing and comprising a printer and/or scanner;
a speaker disposed within the housing; and
an enclosure disposed within the housing between the imaging hardware and the speaker and in which the speaker is mounted, the enclosure configured to acoustically separate the speaker from the imaging hardware to reduce effects caused by the speaker.

2. The device of claim 1, wherein the imaging hardware comprises the printer or the scanner.

3. The device of claim 1, wherein the imaging hardware comprises the printer and the scanner.

4. The device of claim 1, wherein the enclosure is configured to acoustically separate the speaker from the imaging hardware via ribs formed on a surface of the enclosure facing the speaker.

5. The device of claim 1, wherein the enclosure is configured to acoustically separate the speaker from the imaging hardware via a textured surface of the enclosure facing the speaker.

6. The device of claim 1, further comprising:
a wireless interface to receive audio from a user device for output by the speaker.

7. The device of claim 6, wherein the wireless interface includes a Bluetooth module.

8. The device of claim 1, wherein the enclosure comprises:
a lower portion;
an upper portion securably fastened to the lower portion; and
a cavity defined between the lower and upper portions within which the speaker is disposed.

9. The device of claim 8, wherein the enclosure further comprises:
a frame securably fastened to the housing and with which the lower portion is integrally formed.

10. The device of claim 9, wherein the frame defines a slot between the lower portion and the housing.

11. The device of claim 10, further comprising:
a top cover removably placed on the frame to cover the enclosure, the top cover having a slot corresponding to and in alignment with the slot of the frame.

12. The device of claim 8, wherein the enclosure further comprises:
ribs formed on a surface of the lower portion to acoustically separate the speaker from the imaging hardware.

13. The device of claim 12, wherein the surface of the lower portion is textured to further acoustically separate the speaker from the imaging hardware.

14. The device of claim 8, wherein the upper portion has a surface that is textured to acoustically separate the speaker from the imaging hardware.

15. The device of claim 14, wherein the enclosure further comprises:
ribs formed on the surface of the upper portion to further acoustically separate the speaker from the imaging hardware.

16. The device of claim 8, further comprising:
a wireless interface mounted in the enclosure.

17. The device of claim 1, further comprising:
a passive radiator disposed within the housing and mounted to the enclosure,
wherein the enclosure is configured to acoustically separate the passive radiator from the imaging hardware to reduce effects caused by the passive radiator.

18. The device of claim 17, wherein the speaker is a first speaker, the device further comprising:
a second speaker disposed within the housing and mounted to the enclosure, the passive radiator positioned between the first and second speakers,
wherein the enclosure is configured to acoustically separate the second speaker from the imaging hardware to reduce effects caused by the second speaker.

* * * * *